United States Patent Office 2,982,793
Patented May 2, 1961

2,982,793

CATALYSTS AND CATALYTIC HYDROCARBON CONVERSION PROCESSES

Roy Turner and Alan Arthur Yeo, Sunbury-on-Thames, England, assignors to The British Petroluem Company Limited, London, England, a British joint-stock corporation No Drawing. Filed Jan. 23, 1957, Ser. No. 635,587

Claims priority, application Great Britain Feb. 3, 1956

15 Claims. (Cl. 260—672)

This invention relates to improved catalysts and to hydrocarbon conversion processes employing said catalysts.

Catalysts in which nickel is deposited on alumina are known and the use of such catalysts for the dealkylation of aromatics having long chain alkyl groups has been described. The known manner of preparation of these prior catalysts is the impregnation of alumina by nickel nitrate solution followed by roasting at a temperature sufficient to decompose the nitrate to oxide, said temperature generally being below 500° C. Catalysts so prepared have been found to be of low efficiency for the conversion of aromatics, having one or more ring substituted methyl groups, to benzene.

Catalysts in which nickel is deposited on silica are also known; these catalysts are unsatisfactory for the conversion of toluene to benzene, giving low conversions to benzene under mild conditions and considerable proportions of by-products under more severe conditions.

It is an object of this invention to provide a process for the production of improved catalysts. It is a further object to provide improved processes of hydrocarbon conversion. It is a further object to provide an improved process of dealkylation. It is a still further object to provide an improved process for the conversion of toluene to benzene. Other objects will appear hereinafter.

According to the present invention there is provided a process for the production of a catalyst base, suitable for the use as a catalyst or for the production of complex catalysts as hereinafter described, which comprises bringing into contact in either catalytically active form or in a form which, after heat treatment, is catalytically active, an amphoteric oxide with a solution, preferably an aqueous solution, of a compound, decomposable under heat to an oxide of nickel, cobalt or iron and referred to hereinafter as a group VIII compound and thereafter roasting the impregnated amphoteric oxide at a temperature above 650° C.

Preferably the impregnated amphoteric oxide is roasted at a temperature within the range 700°–1000° C. and preferably the period of roasting lies in the range 1–10 hours.

Suitably the group VIII compound is a nitrate, formate or acetate of nickel, cobalt or iron.

A suitable amphoteric oxide is alumina, while the temperature of roasting will lie above 650° C., it is necessary that this temperature lies below that at which a substantial transition to alpha-alumina occurs during the period of roasting. Preferably the alumina is substantially free of elements other than aluminum and oxygen. Preferably the alumina is treated with the group VIII compound while in the form of a wet or dry alumina gel. The gel may be prepared by the hydrolysis of an aluminum alkoxide, for example, the iso-propoxide, peptized, for example by addition of acetic acid, stirred with an aqueous solution of the group VIII compound, dried at low temperature, for example 140° C., and thereafter roasted at a temperature above 650° C.

The material obtained as hereinbefore described is suitable for use as a catalyst, for example, for effecting hydrocarbon conversion reactions and in particular for use as a cracking or polymerization catalyst. The material is also suitable for use as a base in the production of complex catalysts as hereinafter described and for this reason is described herein as the "catalyst base."

According to a further feature of the present invention there is provided a process for the production of a catalyst, hereinafter referred to as "complex catalyst," suitable for use in hydrocarbon conversion pocesses, said complex catalyst being produced by impregnating an amphoteric oxide with a solution, preferably an aqueous solution, of a group VIII compound, decomposable under heat to an oxide of nickel, cobalt or iron and thereafter roasting the impregnated amphoteric oxide at a temperature above 650° C., whereby a catalyst base is formed and thereafter depositing, upon said catalyst base, a catalyst of known activity for effecting the hydrogenation of unsaturated hydrocarbons. Suitably the catalyst deposited upon the catalyst base is platinum, iridium, palladium, nickel, iron, cobalt, chromium oxide or molybdenum oxide. The catalyst is deposited by any of the methods well known in the art. Thus platinum may be deposited by impregnation of the catalyst base with a solution, preferably an aqueous solution, of tetra amine platinous chloride. Chromium oxide or molybdenum oxide may be deposited by impregnation of the catalyst base with a solution, preferably an aqueous solution of respectively chromium nitrate or ammonium molybenate followed by heating to form the oxide. Usually the impregnated catalyst base is roasted at a temperature in the range 350°–650° C., the precise temperature being determined according to the nature of the metallic element in the catalyst so deposited. If necessary, the catalyst is reduced before use by means of a free hydrogen containing gas.

Suitably the compound employed in the second stage is an aqueous solution of a nitrate, formate or acetate of nickel, iron or cobalt and preferably the amphoteric oxide impregnated therewith is roasted at a temperature in the range 350° to 650° C., and preferably in the range 450°–550° C. Suitably the period of roasting is 1–10 hours, preferably being about 90 minutes.

Preferably, before use the catalyst is reduced by means of a free hydrogen containing gas. Preferably the catalyst is reduced by hydrogen at a temperature in the range 350° to 600° C. and preferably about 500° C. Preferably the period of treatment with hydrogen is 2 to 48 hours.

According to a further feature of this invention there are provided improved processes for the conversion of hydrocarbons using the catalysts hereinbefore described.

Thus the present invention comprises a process for hydrocarbon conversion wherein a hydrocarbon, capable of molecular fission in the presence of a cracking catalyst, is passed in vapor phase, and in the presence or absence of added hydrogen, at elevated temperature over a "catalyst base" or "complex catalyst" as hereinbefore described.

According to a further feature of the present invention there is provided a process for hydrocarbon polymerization wherein an unsaturated hydrocarbon, preferably a mono-olefin, for example ethylene, is passed in vapour phase and at elevated temperature over a "catalyst base" or "complex catalyst" as hereinbefore described.

Suitable olefins include ethylene, propylene, butene-1, butene-2 and higher mono-olefins, butadiene and other di-olefins and styrene and other ethylenically unsaturated aryl alkyl hydrocarbons.

According to a further feature of the present invention there is provided a process for the removal of one or more alkyl groups from alkyl-substituted aromatic hydrocarbons and, in particular, for the conversion of said hydrocarbons to benzene, which comprises passing said hydrocarbon in vapor phase in admixture with hydrogen over a "complex catalyst" as hereinbefore described. Preferably the "complex catalyst" employed in this process is a catalyst consisting of nickel deposited on a "catalyst base" obtained by roasting alumina, impregnated with a solution of a nickel compound, at a temperature above 650° C. The process herein described is particularly suitable for the conversion of toluene to benzene since, using the complex catalyst herein described, good yields of benzene are obtained with a low rate of production of by-product.

Hydrocarbons, from which alkyl groups can be removed by the process hereinbefore described include toluene, o-, m- and p-xylene, cumene, mesitylene, pseudocumene and diethylbenzene. The process may be applied to hydrocarbon fractions containing one or more of said hydrocarbons, for example coal tar fractions and petroleum distillate fractions obtained by the platforming process.

The "catalyst base" and "complex catalyst" of this invention may be employed in any form as known in the art, for example, in granular or pelletted form.

The invention is illustrated but in no way limited with reference to the following examples.

EXAMPLE 1

An alumina gel was prepared by shaking 400 grams of aluminium iso-propoxide with one litre of distilled water. Excess aqueous iso-propanol was removed by centrifuging. The moist gel was peptized with 12 ml. of glacial acetic acid and stirred to a smooth consistency while adding a solution consisting of 212 grams of nickel nitrate hexa-hydrate in 200 ml. of water. This gel was dried at 140° C., crushed and sieved to a mesh size 6-12 (British standard sieve) and roasted at a temperature of 900° C. for 2 hours. After roasting, 80 ml. of the catalyst base so obtained were heated to 110° C. for 30 minutes and impregnated with a solution of 142 grams of nickel hexa-hydrate in 100 ml. water for 30 minutes at 110° C. The excess solution was poured off and the impregnated base roasted at 500° C. for 90 minutes.

This catalyst is believed to contain about 26% by wt. of nickel in the catalyst base and about 7% by wt. of nickel deposited on the base.

The catalyst ("catalyst A") was heated to 500° C. in a stream of hydrogen for 16 hours and was then ready for use.

EXAMPLE 2

A cobalt containing catalyst base was prepared by the method described for the production of catalyst base in Example 1 using, in place of 212 grams of nickel nitrate, 300 grams of cobalt nitrate hexa-hydrate.

EXAMPLE 3

An iron-containing catalyst base was prepared by the method described for the production of catalyst base in Example 1, using, in place of 212 grams of nickel nitrate, 350 grams of ferric nitrate hexa-hydrate dissolved in 100 ml. of water.

EXAMPLE 4

200 ml. of 0.125 inch commercial alumina pellets were impregnated at 110° C. for ½ hour with a solution consisting of 200 g. cobalt nitrate hexa-hydrate and some water. The excess solution was poured off and the catalyst base produced by drying at 140° C. and roasted at 900° C. for 2 hrs. This base contained 8.2% wt. cobalt, and was impregnated at 110° C. for ½ hr. with a solution of the same composition as above, the excess solution poured off and the finished catalyst obtained by drying at 140° C. and roasting at 500° C. for 1½ hr. The finished catalyst contained a total of 15.8% cobalt.

EXAMPLE 5

A complex catalyst having nickel impregnated on a cobalt-alumina base was prepared from the catalyst base prepared according to Example 2 by impregnating the base with a solution of 150 g. nickel nitrate hexa-hydrate and 50 ml. water for ½ hr. at 110° C. Excess solution is poured off at the finished catalyst produced by drying at 140° C. and roasting at 500° C. for 1½ hrs. The finished catalyst contains 7.1% nickel and 28.6% wt. cobalt.

EXAMPLE 6

A complex catalyst having nickel impregnated on an iron-alumina base was prepared from the catalyst base prepared according to Example 3 by impregnating this base with the nickel nitrate solution described in Example 5.

EXAMPLE 7

A complex catalyst having platinum on a nickel-alumina base was prepared from the catalyst base described in Example 1.

134 ml. of the catalyst base, was impregnated at 110° C. for ½ hr. with an aqueous solution of tetrammine-platinous chloride. Sufficient solvent was used to cover the catalyst. The mixture of catalyst base and solution was allowed to evaporate to dryness at 140° C. and then roasted at 500° C. for 1½ hr. The platinum content of the finished catalyst was 0.91% wt.

EXAMPLE 8

A complex catalyst having molybdenum on a nickel-alumina base was prepared from the catalyst base described in Example 1. The catalyst base was impregnated at 110° C. for 1½ hours with a solution of 34 grams of ammonium molybdate in 75 ml. of water and 5 ml. of 0.880 gravity ammonia solution. Sufficient solvent was used to cover the catalyst. The mixture of catalyst base and solution was allowed to evaporate to dryness at 140° C. and then roasted at 500° C. for 1½ hr. The finished catalyst contained 11.8% by weight of molybdenum.

EXAMPLE 9

A complex catalyst having iron on a nickel-alumina base was prepared from the catalyst base described in Example 1. The catalyst base was impregnated at 110° C. for ½ hr. with a solution of 100 grams of ferric nitrate hexa-hydrate in 25 ml. of water. Sufficient solvent was used to cover the catalyst. The mixture of catalyst base and solution was allowed to evaporate to dryness at 140° C. and then roasted at 500° C. for 1½ hr. The finished catalyst contained 6.6% by weight of iron.

EXAMPLE 10

The activity of catalyst A, produced as described in Example 1, was compared with a catalyst consisting of 26% nickel deposited at 500° C. on an identical alumina (catalyst B), and one of 7% nickel deposited on a commercial pelletted alumina (catalyst C). The following Table 1 shows the results obtained in the demethylation of toluene by reaction with hydrogen. Catalyst A gives higher yields of benzene with less conversion to undesirable side products.

Table 1

| Run No. | 1 | 2 | 3 | 4 |
|---|---|---|---|---|
| Catalyst composition: | | | | |
| Nickel deposited at 900° C. wt. percent | | | 26.0 | 26.0 |
| Nickel deposited at 500° C. wt. percent | 7.25 | 26.0 | 7.25 | 7.25 |
| Catalyst designation | C | B | A | A |
| Conditions: | | | | |
| Temperature °C | 380 | 385 | 372 | 366 |
| Space velocity [1] v./v./hr. | 0.239 | 0.249 | 0.240 | 0.273 |
| H$_2$ hydrocarbon ratio mol/mol | 3.2 | 6.1 | 1.8 | 2.0 |
| Pressure | (²) | (²) | (²) | (²) |
| Products: wt. percent on Feed: | | | | |
| Benzene wt. percent | 35.3 | 36.1 | 45.3 | 41.2 |
| Toluene do | 39.3 | 21.9 | 34.4 | 38.6 |
| Methane do | 7.2 | 7.4 | 8.9 | 8.5 |
| Other do | 18.2 | 34.6 | 11.4 | 11.7 |

[1] Toluene calculated as liquid.
[2] Atmospheric.

EXAMPLE 11

Toluene at 0.25 vol./vol./hr. was passed with hydrogen, at 364° C., atmospheric pressure and at a hydrogen/toluene mol ratio of 2:1 over the catalyst described in Example 5. The liquid product was 69% by weight on toluene feed and contained 37% by weight of benzene.

EXAMPLE 12

Toluene at 0.25 vol./vol./hr. was passed with hydrogen at 386° C., and atmospheric pressure and at a hydrogen/toluene mol ratio of 2:1 over the catalyst described in Example 6. The liquid product contained some benzene.

EXAMPLE 13

Three tests were carried out using the catalyst described in Example 1 as a dealkylation catalyst for toluene, under the conditions and with the results shown in the following Table 2.

Table 2

| Temperature °C | 450 | 450 | 475 |
|---|---|---|---|
| Pressure p.s.i.g. | 50 | 100 | 50 |
| Space Velocity v./v./hr. | 0.260 | 0.249 | 0.250 |
| H$_2$/HC ratio mol/mol | 2.01 | 2.07 | 2.04 |
| Yield on Feed: | | | |
| Benzene percent wt | 17.1 | 19.3 | 16.5 |
| Toluene do | 64.4 | 54.1 | 63.5 |
| Methane do | 3.5 | 4.0 | 3.4 |

EXAMPLE 14

Toluene at 0.25 vol./vol./hr. was passed with hydrogen at a hydrogen/toluene ratio of 2:1, at 356° C. and its atmospheric pressure over a catalyst as described in Example 7. The liquid product was 83.3% by weight on toluene fed and contained 25.7% by weight of benzene.

EXAMPLE 15

Toluene at 0.5 vol./vol./hr. was passed with hydrogen at a hydrogen/toluene ratio of 2:1, at 360° C. and at atmospheric pressure over a catalyst as described in Example 4. The liquid product was 90% by weight on toluene fed and contained 7.1% by weight of benzene.

EXAMPLE 16

Toluene at 0.25 vol./vol./hr. was passed with hydrogen at a hydrogen/toluene ratio of 2:1, at 377° C. and at atmospheric pressure over a catalyst as described in Example 8. The liquid product was 88% by weight of toluene feed and contained 4.9% by weight of benzene.

EXAMPLE 17

Toluene at 0.2 vol./vol./hr. was passed with hydrogen at a hydrogen/toluene ratio of 2:1 at 377° C. and at atmospheric pressure over a catalyst as described in Example 9. The liquid product was 72.8% by weight of toluene fed and contained 30.2% by weight of benzene.

EXAMPLE 18

A nickel on nickel-alumina catalyst having a base containing 31.6% nickel and a total nickel content of 43.3% nickel was used for the hydrogenation of benzene.

The reaction conditions employed and results obtained are shown in the following Table 3.

Table 3

| Temperature °C | 217 | 224 |
|---|---|---|
| Pressure p.s.i.g. | 313 | 413 |
| Space Velocity v./v./hr. | 0.9 | 0.9 |
| Hydrogen rate [1] litres/hrs. | 235 | 215 |
| Yield on Feed: | | |
| Cyclohexane percent wt | 65.5 | 72.8 |
| Benzene do | 31.1 | 32.0 |

[1] Approximately 4 mole Hydrogen/mole benzene feed.

EXAMPLE 19

The catalyst described in Example 18 was employed for the hydrogenation of normal octene. At a liquid feed rate of 2 vol./vol./hour, the n-octene was passed in vapor phase with hydrogen over the catalyst, at 260° C. and 310 lbs./sq. in. pressure. The product obtained consisted almost entirely of normal octane, with very little normal octene.

As hereinbefore described, the catalyst base and complex catalyst according to this invention is suitable for use in carrying out reactions for the conversion of substituted or unsubstituted hydrocarbons which are capable of molecular fission in the presence of a cracking catalyst. It has been found that the catalysts bases and complex catalysts according to the invention are also suitable for use in carrying out the hydrogenation of unsaturated hydrocarbons, said hydrocarbons being substituted with non-hydrocarbon radicals or unsubstituted.

Thus according to a further feature of this invention there is provided a process wherein an unsaturated hydrocarbon, being substituted or unsubstituted with non-hydrocarbon radicals, is passed in vapor phase in the presence of hydrogen at elevated temperatures over a "catalyst base" or "complex catalyst" as hereinbefore described. Suitable ethylenically unsaturated unsubstituted hydrocarbons include olefins, for example ethylene, propylene, butene-1, butene-2, pentenes, hexenes, butadiene and higher olefines, for example, diisobutylene, propylene dimer and propylene trimer. Suitable ethylenically unsaturated substituted hydrocarbons include unsaturated fatty acids, for example oleic acid and linoleic acid; unsaturated alcohols and unsaturated esters. Suitable aromatic hydrocarbons which may be reduced to naphthenes include benzene, toluene, xylenes, ethylbenzene, cumene, psuedo-cumene mesitylene, diphenyl and naphthalene.

Preferred reaction temperatures for the above described hydrogenation reactions lie in the range 150–400° C. Pressure may be atmospheric or elevated, preferably lying in the range 200–1000 lbs./sq. in.

For the processes for the removal of alkyl groups from alkyl substituted aromatics, hereinbefore described, the preferred reaction temperatures lie in the range 250–500° C. and the preferred pressures lie in the range atmospheric to 200 lbs./sq. in. It will be appreciated that many aromatic feedstocks will be capable of undergoing both hydrogenation and dealkylation reactions according to the conditions of temperature and pressure selected and at selected temperatures and pressures may be caused to undergo both reaction simultaneously. In general an increase in reaction pressure and/or a reduction in reaction temperatures will favor hydrogenation reactions at the expense of dealkylation reactions.

Preferably the catalyst base contains in total 1–50% by weight of nickel, cobalt or iron, the range 25–40% being particularly preferred, 33% being very suitable. Preferably, in the complex catalyst the total weight of metal deposited on said catalyst base lies in the range 1–30% by weight of complex catalyst the range 10–20% by weight being preferred.

We claim:
1. The method of producing a complex catalyst comprising depositing a metal selected from the group consisting of nickel, cobalt, and iron on an amphoteric oxide, said metal being decomposable under the action of heat to the oxide thereof, roasting the treated amphoteric oxide at a temperative above 650° C. to form a catalyst base, further depositing a metal selected from the group consisting of nickel, cobalt, iron, platinum, iridium, palladium, chromium, and molybdenum on said catalyst base, and roasting the deposited catalyst base at a temperature between about 350°–650° C. to produce the desired catalyst.

2. The method of producing a complex catalyst comprising impregnating an amphoteric oxide with a solution of a metal compound selected from the group consisting of nickel, cobalt, and iron, said metal being decomposable under the action of heat to the oxide thereof, roasting the impregnated oxide at a temperature above 650° C. to form the catalyst base, further impregnating the catalyst base with a solution of a metal compound selected from the group consisting of nickel, cobalt, iron, platinum, iridium, palladium, chromium, and molybdenum, and roasting the further impregnated base at a temperature between about 350°–650° C. to produce the desired catalyst.

3. A complex catalyst prepared by the method set forth in claim 2.

4. The method in accordance with claim 2 wherein the amphoteric oxide is alumina.

5. The method in accordance with claim 2 wherein the solution of a metal compound employed to further impregnate the treated catalyst base is the same metal employed in the initial impregnation of the amphoteric oxide.

6. The method in accordance with claim 5 wherein the amphoteric oxide is alumina.

7. The method in accordance with claim 5 wherein the amphoteric metal is alumina and the metal compound employed is a nickel compound.

8. The method in accordance with claim 2 wherein the formed complex catalyst is reduced by contacting same with a gas containing free hydrogen at a temperature in the range of about 330°–600° C.

9. A process for the conversion of hydrocarbons comprising contacting a hydrocarbon in vapor phase at an elevated temperature with a complex catalyst, said catalyst being prepared by impregnating an amphoteric oxide with a solution of a metal compound selected from a group consisting of nickel, cobalt, and iron, said metal being decomposable under the action of heat to the oxide thereof, roasting the impregnated oxide at a temperature above 650° C. to form the catalyst base, further impregnating the formed catalyst base with a solution of a metal compound selected from the group consisting of nickel, cobalt, iron, platinum, iridium, palladium, chromium, and molybdenum, and roasting the further impregnated base at a temperature between 350°–650° C.

10. A process in accordance with claim 9 wherein the conversion is in the presence of hydrogen.

11. A process in accordance with claim 9 wherein the conversion is in the absence of hydrogen.

12. A process in accordance with claim 9 wherein the conversion temperature is in the range of about 150°–500° C. and the pressure employed therein is in the range of atmospheric pressure to about 1,000 lbs. p.s.i.g.

13. The process for the polymerization of unsaturated hydrocarbons comprising contacting an unsaturated hydrocarbon in a vapor phase and at an elevated temperature with a complex catalyst, said catalyst being prepared by impregnating an amphoteric oxide with a solution of a metal compound selected from the group consisting of nickel, cobalt, and iron, said metal being decomposable under the action of heat to the oxide thereof, roasting the impregnated oxide at a temperature above 650° C., further impregnating the catalyst base with the solution of a metal compound selected from the group consisting of nickel, cobalt, iron, platinum, iridium, palladium chromium, and molybdenum, and roasting the further impregnated base at a temperature between 350°–650° C.

14. The process for the conversion of an alkyl substituted aromatic hydrocarbon to an aromatic hydrocarbon of low molecular weight comprising contacting an alkyl substituted aromatic hydrocarbon in vapor phase and in the presence of hydrogen at a temperature between about 250°–500° C. and at a pressure of atmospheric to 2,000 lbs. p.s.i.g. with a complex catalyst, said catalyst being prepared by impregnating an amphoteric oxide with a solution of a metal compound selected from the group consisting of nickel, cobalt, and iron, said metal being decomposable under the action of heat to the oxide thereof, roasting the impregnated oxide at a temperature above 650° C., further impregnating the catalyst base with the solution of a metal compound selected from the group consisting of nickel, cobalt, iron, platinum, iridium, palladium, chromium, and molybdenum, and roasting the further impregnated base at a temperature between 350°–650° C.

15. A process for the hydrogenation of unsaturated hydrocarbons comprising contacting an unsaturated hydrocarbon in the vapor phase and in the presence of hydrogen and at a temperature between 150°–400° C. and at a pressure of between about 200–1,000 lbs. p.s.i.g. with a complex catalyst, said catalyst being prepared by impregnating an amphoteric oxide with a solution of a metal compound selected from the group consisting of nickel, cobalt, and iron, said metal being decomposable under the action of heat to the oxide thereof, roasting the impregnated oxide at a temperature above 650° C., further impregnating the catalyst base with the solution of a metal compound selected from the group consisting of nickel, cobalt, iron, platinum, iridium, palladium, chromium, and molybdenum, and roasting the further impregnated base at a temperature between 350°–650° C.

References Cited in the file of this patent

UNITED STATES PATENTS

| | | |
|---|---|---|
| 2,687,370 | Hendricks | Aug. 24, 1954 |
| 2,721,226 | Ciapetta et al. | Oct. 18, 1955 |
| 2,818,394 | Haensel et al. | Dec. 31, 1957 |

FOREIGN PATENTS

| | | |
|---|---|---|
| 717,062 | Great Britain | Oct. 20, 1954 |